United States Patent [19]
Delarbre et al.

[11] 3,738,771
[45] June 12, 1973

[54] ROTOR BLADES OF ROTARY MACHINES, PROVIDED WITH AN INTERNAL COOLING SYSTEM

[75] Inventors: Jeanne Genot Nee Delarbre, Sceaux; Emile Le Grives, Fontenay-aux-Roses; Guy Berland, Chatillon, all of France

[73] Assignee: Office National d'Etudes et de Recherches Aerospatiales, Chatillon-sans-Bagneux, France

[22] Filed: July 15, 1971

[21] Appl. No.: 162,849

[30] Foreign Application Priority Data
July 20, 1970 France .............................. 7026718

[52] U.S. Cl. ................................ 416/96, 415/114
[51] Int. Cl. ............................................. F01d 5/18
[58] Field of Search ..................... 416/96; 415/114

[56] References Cited
UNITED STATES PATENTS
2,141,401  12/1938  Martinka ...................... 415/114 X
2,150,098  3/1939  Jodeiko ............................ 416/96 X
2,843,354  7/1958  Smith .................................. 416/92
2,888,243  5/1959  Pollock .............................. 416/92
3,164,367  1/1965  Lynch ........................ 415/114 UX FOREIGN PATENTS OR APPLICATIONS
1,002,570  2/1957  Germany ............................ 416/96
610,737  10/1948  Great Britain .................... 415/114
651,830  4/1951  Great Britain ..................... 416/96
985,772  3/1965  Great Britain ..................... 416/96

*Primary Examiner*—Everette A. Powell, Jr.
*Attorney*—Larson, Taylor & Hinds

[57] ABSTRACT

The cooling system is by phase transition in circulation in a closed cycle of a cooling fluid. The blade includes several closed elemental cavities, the wall of each elemental cavity including at least one continuous stria extending over its length along a helicoidal track. It is useful for aircraft gas turbine blades.

7 Claims, 8 Drawing Figures

ROTOR BLADES OF ROTARY MACHINES, PROVIDED WITH AN INTERNAL COOLING SYSTEM

The invention relates to rotor blades of rotary machines, especially aircraft gas turbines, these blades being each provided with an internal cooling system by phase transition and circulation in closed cycle of a cooling fluid.

Each of these blades comprises a closed internal cavity, in which the cooling fluid occupies a portion only of the volume, the physical properties of this cooling fluid being such that it is vaporized in certain regions of this internal cavity by reason of the temperature which exists in the said regions during a normal condition of operation of the blade.

In such a blade, the internal cavity extends from the root or foot of the blade, subject to a natural cooling (by conduction into the wheel of the rotary machine) or forced (by circulation of a secondary cooling fluid), up to the tip or extremity of the blade, and this internal cavity hence traverses regions of the blade subject to the thermal flow of the gas circulating in the rotary machine.

The liquid phase of the cooling fluid, under the action of centrifugal force, is spread towards the regions of the blade which are subject to this thermal flow, in which regions the cooling flow is vaporized; the return of the vapor towards the foot of the blade operating through the "pumping" action maintained by the condensation of the vapors precisely in the foot of the blade.

This cooling system enables large thermal exchanges between the regions of the blade subject to thermal flow and its foot subject to natural or forced cooling, and this due to the cycle of vaporization and of condensation which brings into action the latent heat of vaporization of the cooling fluid, the differences in temperature between the regions of the blade subject to the thermal flow and its foot remaining rather small, which is favorable from the point of view of the mechanical strength of the blade.

The principal problem posed by the application of such a cooling system resides in the distribution of the liquid phase of the cooling fluid over the walls of the internal cavity of the blade. In fact, the homogeneity of cooling of the regions of the blade subject to the thermal flow depends on a regular distribution of the liquid phase of the cooling fluid.

It is an object of the invention to provide a blade in which the distribution of the liquid phase of the cooling fluid is regular over the walls of the internal cavity of the blade, which enables homogeneous cooling of the regions of the blade subject to the thermal flow to be obtained.

The blade according to the invention is provided with a cooling system by phase transition and circulation in a closed cycle of a cooling fluid of which the liquid phase occupies a portion only of an internal cavity provided in the blade, the physical properties of this cooling fluid being such that it is vaporized in certain regions of the abovesaid internal cavity during the normal condition of operation of the blade, and it is characterized by the fact that, this internal cavity is constituted by several closed elemental cavities each extending from the foot of the blade up to its extremity by following substantially the average radial direction of the blade, and each having over its all length a transverse section of which the contour is a rounded continuous line, and the wall of each of these elemental cavities comprises at least one continuous strip (hollow or projecting) extending over a portion at least of the length of the elemental cavity by following a helicoidal track.

It is then envisaged that, due to the separations existing between the elemental cavities, a preferential distribution towards the trailing edge or towards the leading edge of the blade is avoided on acceleration or angular deceleration of the rotary machine, and due to the one or more helicoidal striae provided in the wall of each of the elemental cavities there is obtained a homogeneous distribution of the liquid phase of the cooling fluid over the abovesaid walls.

The invention consists, apart from the main feature which has just been considered above, of certain other features which are preferably used at the same time and which will be more explicitly considered below.

In order that the invention may be more fully understood, several preferred embodiments of blades according to the invention are described below purely by way of illustrative and non-limiting examples, with reference to the accompanying drawings, in which:

FIG. 1 in an axial section along the line I—I of the FIG. 2 of one embodiment of a blade constructed according to the invention;

The blade according to the invention is provided with an internal cooling system by phase transition and circulation in a closed cycle of a cooling fluid of which the liquid phase occupies a portion only of an internal cavity provided in the blade.

This cooling fluid can advantagously be constituted by a liquid metal such as sodium or potassium, or a mixture of these two metals.

In any case, the physical properties of this cooling fluid are such that, at a temperature which exist in certain regions of the abovesaid internal cavity during the normal condition of operation of the blade, this cooling liquid is vaporized in these regions.

The choice of an alkali metal, such as indicated above, is justified because the vapor pressure of such a metal is rather small and mechanical stresses which are too high are thus avoided in the wall of the blade.

According to the invention, the internal cavity of the blade is constituted by several elemental cavities $1a$, $1b$, $1c$, $1d$, $1e$, $1f$, closed, each extending from the foot of the blade up to its extremity by following substantially the average radial direction of the blade, and each having over its whole length a cross-section, that is a section perpendicular to the average radial direction of the blade, of which the contour is a rounded continuous line.

In the embodiment illustrated in FIGS. 1 to 4, the contour of this cross-section is circular or substantially circular.

Figure 1:
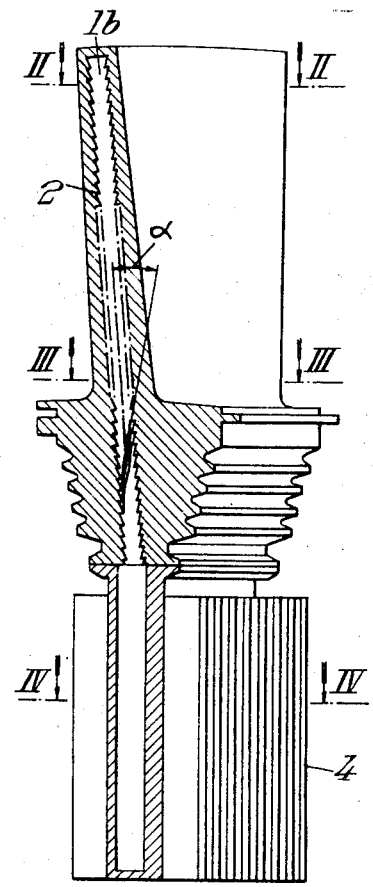
Figure 2:
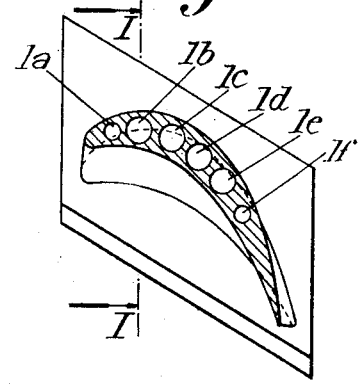
FIG. 2 is a section along the line II—II of FIG. 1.
Figure 3:
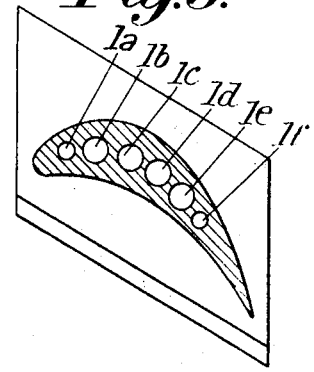
FIG. 3 is a section along the line III—III of FIG. 1.
Figure 4:
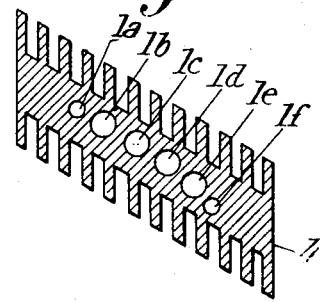
FIG. 4 is a section along the line IV—IV of FIG. 1.
Figure 5:
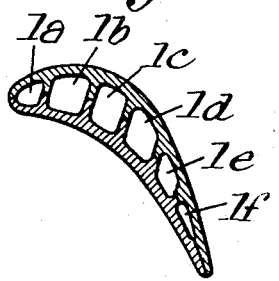
FIG. 5 is a cross-section of another embodiment of a blade constructed according to the invention.

In the embodiment illustrated in FIG. 5, the contour of this cross-section has three or four sides, rectilinear or substantially rectilinear, connected between themselves by rounded portions of curves.

In any case, whatever the shape of this contour, the wall of each of the elemental cavities comprise at least one continuous stria 2 hollow or projecting, extending over the length of the elemental cavity by following a helicoidal track.

A drop of cooling fluid in its liquid phase follows a portion of free path in the elemental cavity, which forms an angle $\alpha$ with the average radial direction of the blade.

If the distance existing between the axis of rotation of the blade and the point where the drop is detached from the wall of the elemental cavity is denoted by $r_o$, and the radius of this elemental cavity, assumed cylindrical, by $a$, it can be shown that this angle $\alpha$ is a function only of the ratio $a/r$.

Figure 8:
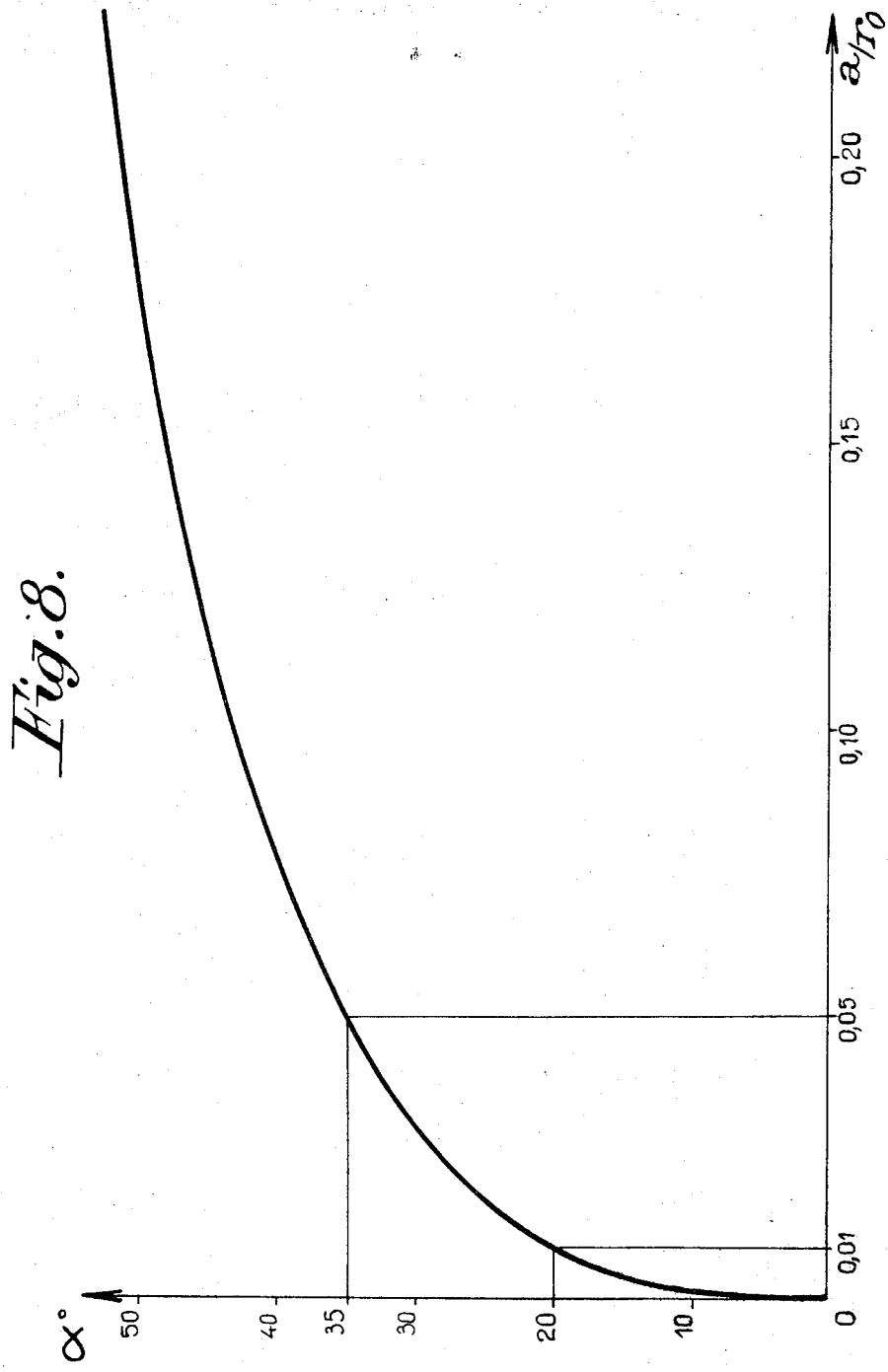
FIG. 8 is an explanatory graph.

The value of $\alpha$ is shown in the graph illustrated in FIG. 8, on which there is represented, as abscissa, the value of the ratio $a/r_o$, and as ordinates, the value of the angle $\alpha$.

For configurations of blades which are known up to the present, the ratio $a/r_o$ is generally comprised between about 0.01 and 0.05.

Now, for values of the ratio $a/r_o$ comprised between 0.01 and 0.05, the value of the angle $\alpha$ is comprised between 20° and 35°.

Under these conditions, the striae provided in the wall of each of the elemental cavities is arranged so that the angle formed by the helicoidal track of each stria and the average radial direction of the blade corresponds with the angle $\alpha$ which has just been considered above.

The average angle formed by the helicoidal track of each stria and the average radial direction of the blade will hence be comprised between 10° and 50°, and preferably between 20° and 35° for reasons which have just been explained above.

Figure 7:
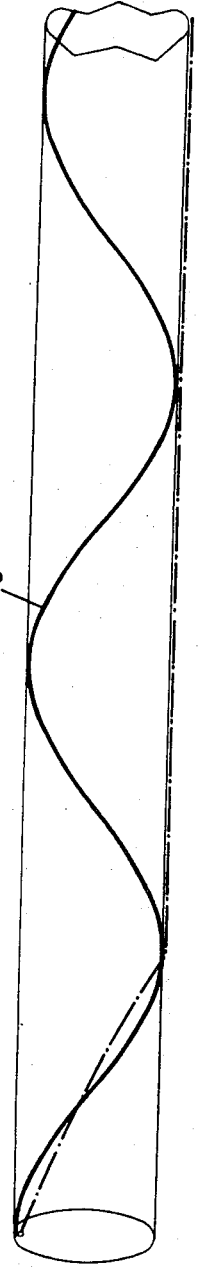
FIG. 7 is a diagram in perspective illustrating the operation of a blade constructed according to the invention; and lastly.

In FIG. 7, there is shown in diagrammatic perspective, an elemental cavity, and there has been shown in this cavity, in discontinuous line, the trajectory which a drop of cooling liquid would have in its liquid phase in the absence of striae provided in the walls of the cavity, this trajectory being substantially flat, and, in nondiscontinuous line, the helicoidal track of a stria 2 provided in the wall of the internal cavity.

It is then seen that each drop of cooling fluid in its liquid phase will be obliged to follow the one or more striae 2 after having effected a portion of free path, which ensures a regular distribution of the drops over the whole of the wall of the elemental cavity.

In the majority of cases, and considering what has been said with regard to the average angle formed by the helicoidal track of each stria and the average radial direction of the blade, it is apparent that the wall of each of the elemental cavities comprises several continuous striae which follow, over this wall, helicoidal tracks with parallel or substantially parallel turns in the manner of threads of a screw with multiple threads.

For a given cooling fluid, the dimension of the drops can be estimated from the equilibrium of the forces of inertia, surface tension and pitot pressure of the flow of the cooling fluid in the vapor phase, and, from this estimation, the geometry of the one or more striae 2 can be specified.

Figure 6:
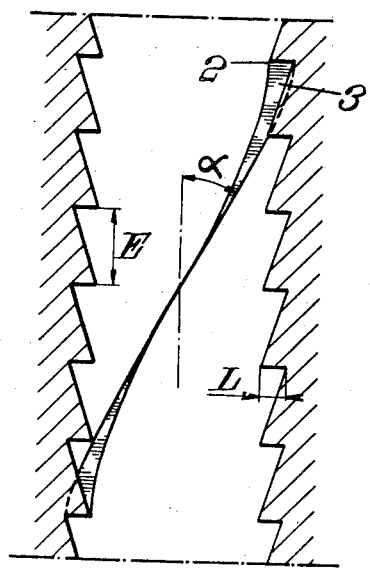
FIG. 6 is a partial axial section, on a larger scale, illustrating a detail of the embodiment shown in FIG. 1.

Preferably and as shown in FIG. 6, each stria 2 defines a flat path 3 oriented substantially perpendicularly to the average radial direction of the blade and turned towards the foot of the blade, the width L of this flat path being comprised between 1/10 and 5/10 mm.

Under these conditions, the number of striae 2 is such that the separation E of two successive flat paths 3 is comprised between two and five times their width.

Thus, in the case of a cylindrical elemental cavity whose radius is equal to 1 mm and which comprises several striae 2 of which the helicoidal track forms an average angle with the average radial direction of the blade of 30°, the width of the flat path 3 can be from 0.2 or from 0.3 mm, which will lead to a separation of the two successive flat paths 3 of 0.6 mm or 0.9 mm, the number of helicoidal striae then being 18 or 12.

In any case, and whatever the embodiment employed, it is preferable that the residual pressure of the uncondenssable gases be reduced, in each elemental cavity, to a value less than $10^{-5}$ Torr.

When a secondary circulation of cooling fluid is provided inside the wheel of the turbine, the foot of the blade can be extended in the direction of the axis of rotation of the said wheel by a finned cooling device 4, each of the closed elemental cavities $1a$, $1b$, $1c$, $1d$, $1e$, $1f$ of the said blade being extended into the said cooling device 4.

As a result of which and whatever the embodiment adopted, there is provided a blade provided with an internal cooling system of the type mentioned in the introduction of the present description and in which the distribution of the liquid phase of the cooling fluid is regular over the walls of the elemental cavities of the blade, which enables homogeneous cooling of the regions of the blade subject to thermal flow to be obtained.

In fact, the drops of cooling fluid in its liquid phase will be formed on the flat path 3 of the striae 2 and will be guided up to the outer end of each elemental cavity. In any case, if these drops escaped from the flat tracks 3 of the striae 2, they will be rapidly recovered a little higher by the following striae.

Moreover, the secondary rotary movement around the axis of the elemental cavities achieves a centrifugal action favorable to thermal exchanges with the wall of the elemental cavities, which centrifugal action which tends to neutralize the prejudicial effect of the force of Coriolis.

As is self-evident and as emerges already from the foregoing, the invention is in no way limited to those of its method of application, nor to those of its methods of application, nor to those of its methods of production of its various parts, which have been more especially indicated; it encompasses, on the contrary, all variations.

We claim :

1. Rotor blade provided with an internal cooling system by phase transition and circulation in a closed cycle of a cooling fluid of which the liquid phase occupies one portion only of an internal cavity provided in the blade, the physical properties of said cooling fluid being such that it is vaporized in certain regions of said internal cavity during normal conditions of operation of the blade, said internal cavity being constituted by a plurality of closed elemental cavities, each extending from the root of the blade to its tip along substantially the average radial direction of the blade, and each elemental cavity having over its whole length a cross-section of which the contour is a rounded continuous line, and the wall of each said elemental cavity having a plurality of continuous hollow or projecting striae extending over a portion at least of the length of the elemental cavity by following helicoidal tracks, with parallel or substantially parallel turns, the average angle formed by the helicoidal track of each stria and the average radial direction of the blade being comprised between 10° and 50°.

2. Blade according to claim 1, wherein the said angle is comprised between 20° and 35°.

3. Blade according to claim 1, wherein each stria defines a flat path oriented substantially perpendicularly to the average radial direction of the blade and turned towards the foot of the blade, the width of this flat path being comprised between 1/10 and 5/10mm, the number of striae being then such that the separation of two successive flat paths is comprised between two and five times their width.

4. Blade according to claim 1, wherein, in each elemental cavity, the residual pressure of the uncondensable gases is reduced to a value less than $10^{-5}$ Torr.

5. Blade according to claim 1, for mounting on a turbine whose wheel is cooled by an internal circulation of a secondary cooling fluid, and wherein the foot of the blade is extended in the direction of the axis of rotation of the wheel by a cooling device with fins, each of the elemental cavities of said blade being extended into said finned cooling device.

6. Blade according to claim 1, wherein the contour of the cross section of each elemental cavity is circular or substantially circular.

7. Blade according to claim 1, wherein the contour of the cross section of each elemental cavity has three of four sides, rectilinear or substantially rectilinear, connected between themselves by portions with rounded curves.

* * * * *